(12) United States Patent
Koike

(10) Patent No.: US 7,986,967 B2
(45) Date of Patent: Jul. 26, 2011

(54) WIRELESS COMMUNICATION SYSTEM AND METHOD

(75) Inventor: Toru Koike, Setagaya-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 837 days.

(21) Appl. No.: 11/686,659

(22) Filed: Mar. 15, 2007

(65) Prior Publication Data

US 2007/0225037 A1    Sep. 27, 2007

(30) Foreign Application Priority Data

Mar. 22, 2006    (JP) ................................ 2006-077966

(51) Int. Cl.
*H04M 1/00* (2006.01)
(52) U.S. Cl. ..................... 455/556.1; 455/566; 455/557; 455/411; 713/168
(58) Field of Classification Search .................... 455/556
See application file for complete search history.

(56) References Cited

U.S. PATENT DOCUMENTS

| | | | |
|---|---|---|---|
| 2004/0123033 A1* | 6/2004 | Rudelic | 711/118 |
| 2004/0151242 A1* | 8/2004 | Chang | 375/240.01 |
| 2005/0148326 A1* | 7/2005 | Nogawa et al. | 455/420 |
| 2005/0285944 A1* | 12/2005 | Watanabe et al. | 348/207.1 |
| 2006/0073785 A1* | 4/2006 | Klassen et al. | 455/3.01 |
| 2006/0208088 A1* | 9/2006 | Sekiguchi | 235/472.02 |
| 2006/0220982 A1* | 10/2006 | Ueda | 345/1.1 |

FOREIGN PATENT DOCUMENTS

JP        2003-248534 A        9/2003

* cited by examiner

*Primary Examiner* — Kamran Afshar
*Assistant Examiner* — Xiang Zhang
(74) *Attorney, Agent, or Firm* — Canon USA Inc. IP Division

(57) ABSTRACT

A first wireless communication device stores identification display information representing at least one other wireless communication device in a memory, and a second wireless communication device controls a display unit of the second wireless communication device to display information based on the identification display information.

8 Claims, 8 Drawing Sheets

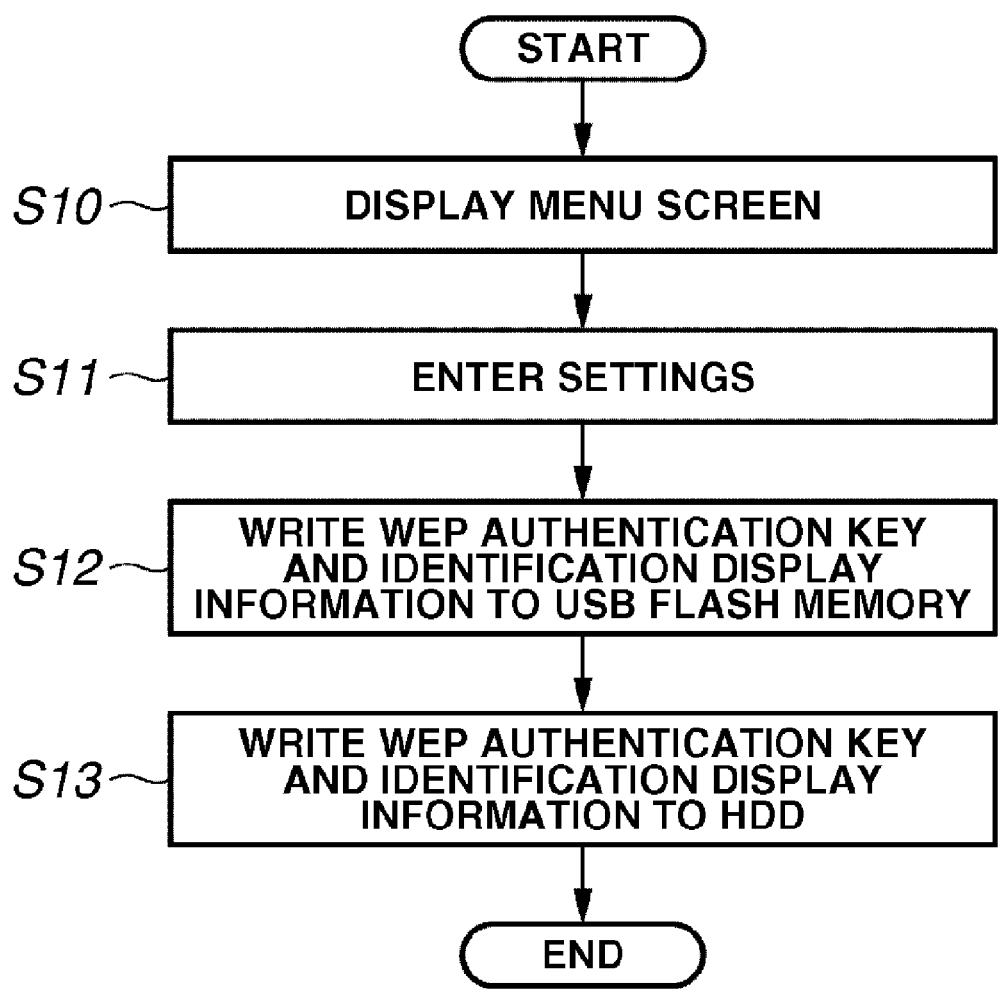

WIRELESS COMMUNICATION SYSTEM AND METHOD

BACKGROUND OF THE INVENTION

1. Field of the Invention

The present invention relates to wireless communication system and method for connecting a wireless-communication host device to a wireless-communication slave device after authenticating the slave device.

2. Description of the Related Art

Devices supporting the IEEE 802.11 wireless network or Bluetooth as a short range wireless system have been introduced to the market and used in homes and offices thanks to usability, mobility, and flexibility.

In addition, as a wireless networks, there are ad hoc wireless networks and infrastructure wireless networks. In the ad hoc wireless network, peer wireless devices, such as a wireless PC, a tablet, a wireless printer, or a personal digital assistant (PDA), communicate directly with each other without going through a wireless access point (AP). On the other hand, in an infrastructure wireless network, plural wireless terminals on the wireless network can communicate with each other through a wireless access point.

Further, in the ad hoc wireless network and the infrastructure wireless network, a technique of encrypting wireless communication data such as Wired Equivalent Privacy (WEP) authentication key has been adopted.

In communications between personal computers (PC), a method of transferring setting parameters of a local area network between PCs using a removable storage medium, such as a floppy disk, has been known.

In recent years, a USB flash memory in which a Universal Serial Bus (USB) connector is attached to a storage as a flash memory, has been used as an alternative to the floppy disk. Japanese Patent Application Laid-Open No. 2003-248534 discusses a device capable of indicating a communication state with light emitted by a light emitting diode (LED) added to a USB flash memory.

The wireless network should secure an encrypted wireless communication path between wireless devices communicating with each other. Therefore, it is necessary to set a network name that specifies a wireless network, or identification information (so-called Extended Service Set Identifier SSID)) and set a WEP key as an encryption key at each wireless terminal. In some wireless networks, an encryption scheme should be set as well. Such a setup is not easy for a general user, which may hinder safe, widespread use of the wireless network.

SUMMARY OF THE INVENTION

The present invention is directed to a wireless communication system and method that facilitate the steps for setting up the wireless communication system.

According to an aspect of the present invention, a wireless communication system includes a plurality of wireless communication devices, the plurality of wireless communication devices connectable via a removable memory, wherein a first wireless communication device includes a setting device configured to set a control information to control a display image to be displayed by a display unit of at least one other wireless communication device, a write unit configured to write the control information together with an authentication key for wireless communication to the removable memory, wherein a second wireless communication device includes a display control unit configured to control a display unit of the second wireless communication device to display the display image in accordance with the control information stored in the removable memory in case the second wireless communication device communicates with the first wireless communication device by using the authentication key stored in the removable memory.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a flowchart of a process of setting identification display information according to the exemplary embodiment.

DETAILED DESCRIPTION OF THE EMBODIMENTS

Various exemplary embodiments, features, and aspects of the invention will be described in detail below with reference to the drawings.

Figure 1:
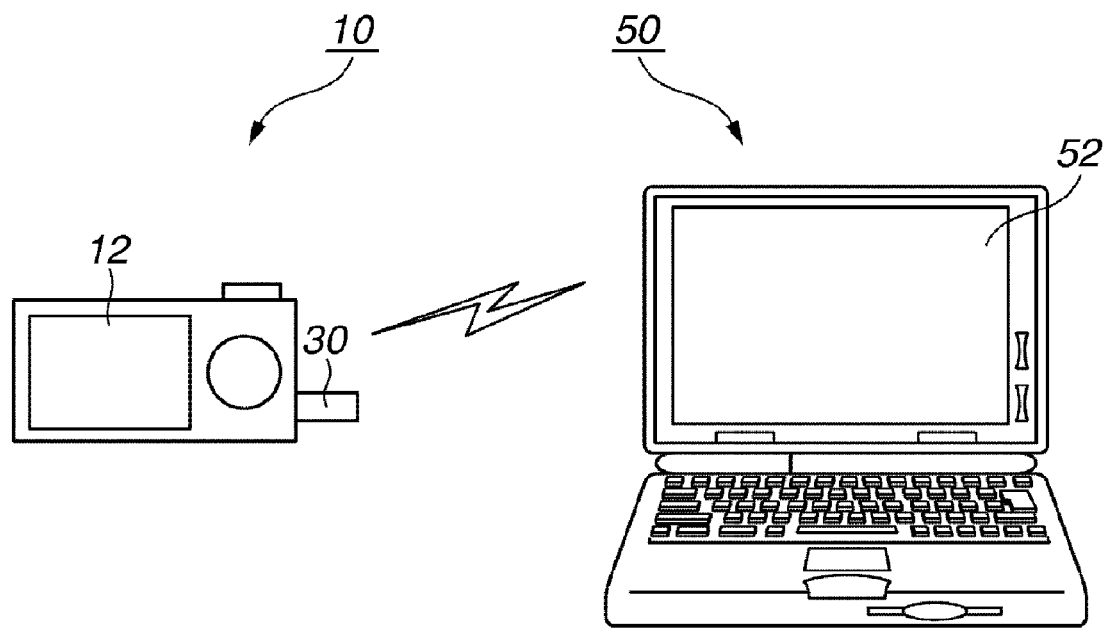
FIG. 1 illustrates a configuration of a wireless communication system according to an exemplary embodiment of the present invention.

FIG. 1 illustrates a configuration of a wireless communication system according to an exemplary embodiment of the present invention. A wireless communication device 10 is a digital camera or a digital video camcorder, which is equipped with a liquid crystal panel 12 and to which a USB flash memory 30 is removably inserted. A personal computer (PC) 50 includes a display 52 and an HDD (hard disk) (not shown). The PC 50 further includes a USB port (not shown) connectable with a USB flash memory 30.

Figure 2:
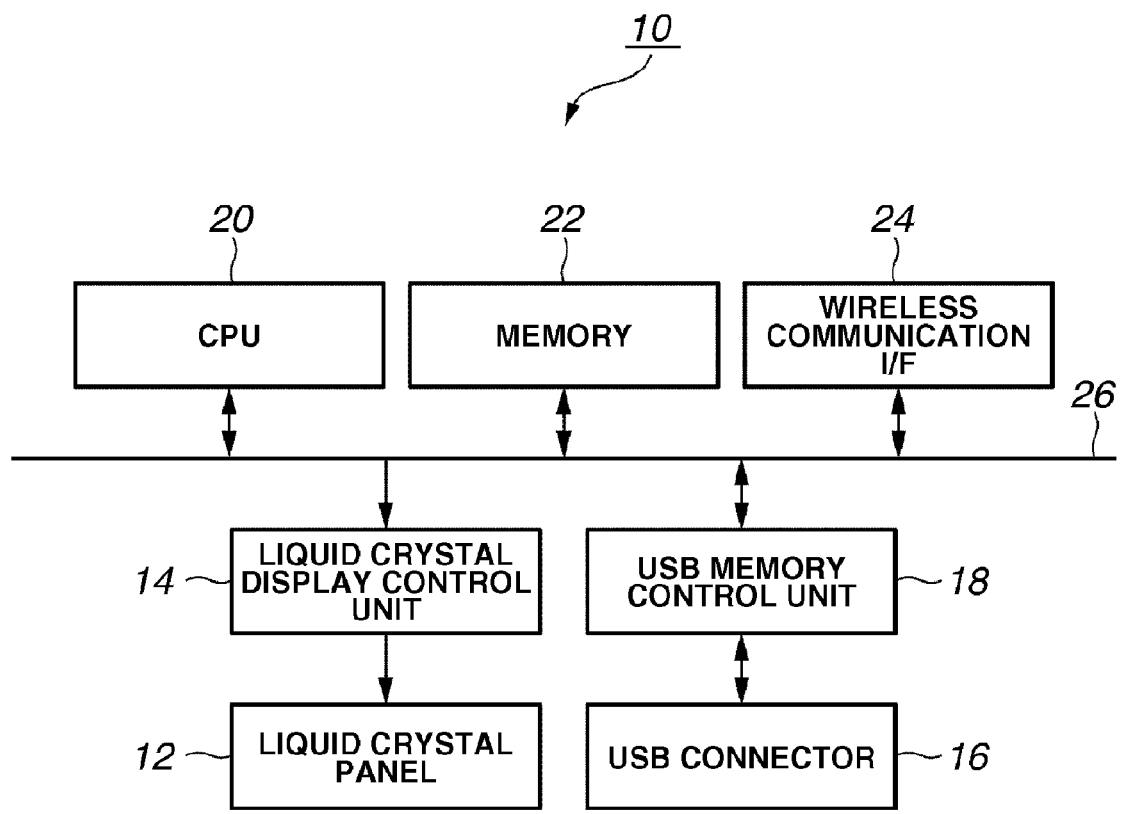
FIG. 2 is a block diagram of a configuration of a wireless communication device according to the exemplary embodiment.

As illustrated in FIG. 2, the wireless communication device 10 includes a liquid crystal panel 12, a liquid crystal display control unit 14, a USB connector 16, a USB memory control unit 18, a central processing unit (CPU) 20, a memory 22, a wireless communication I/F (interface) unit 24, and an internal bus 26.

As will be described in detail below, the liquid crystal panel 12 displays graphic symbols of a shape, a color, and a period, which are designated by another device wirelessly communicating with the wireless communication device 10 as identification information visually representing the other device. The liquid crystal display control unit 14 controls a liquid crystal panel 12. The USB connector 16 is an interface connecting the USB flash memory 30. The USB memory control unit 18 controls writing/reading data to/from a USB device connected to the USB connector 16.

The CPU 20 controls the wireless communication device 10. The memory 22 stores a program code and data necessary for the wireless communication device 10, and the program code is executed by the CPU 20.

The wireless communication I/F unit 24 includes a radio frequency (RF) circuit, an antenna, and the like, and communicates with the PC 50 by radio. The bus 26 is integrated with a direct memory access (DMA) controller (not shown), and used for data transfer between components in the wireless communication device 10. While the present embodiment refers to communication via radio, any other type of wireless communication that would enable practice of the present invention is applicable.

The internal configuration of PC 50 is similar to that of the wireless communication device 10 illustrated in FIG. 2, and as such, is not described in detail herein. In addition to the components illustrated in FIG. 2, the PC 50 includes a keyboard or mouse for selecting and setting identification display information as described below. A CPU (not shown) in the PC 50 controls the processes of the flowcharts of FIGS. 3 and 5.

Referring to FIG. 3 and FIGS. 4A to 4C, data is described which is recorded on the USB flash memory 30. FIG. 3 is a flowchart of a process of setting identification display information that visually represents a device that the wireless communication device 10 will be wirelessly communicating with. The identification display information is composed of three elements: a shape, a color, and a period.

Figure 4A:
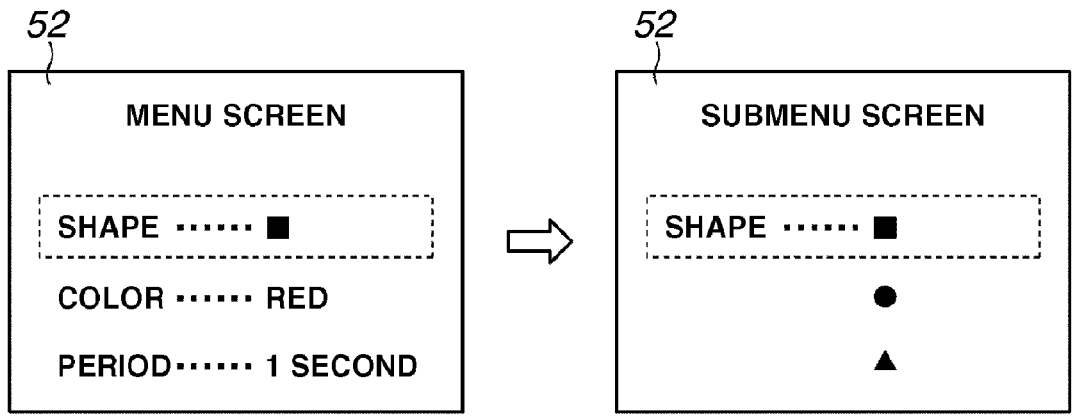
FIGS. 4A to 4C illustrate an example of a menu screen for setting identification display information according to the exemplary embodiment.
Figure 4B:
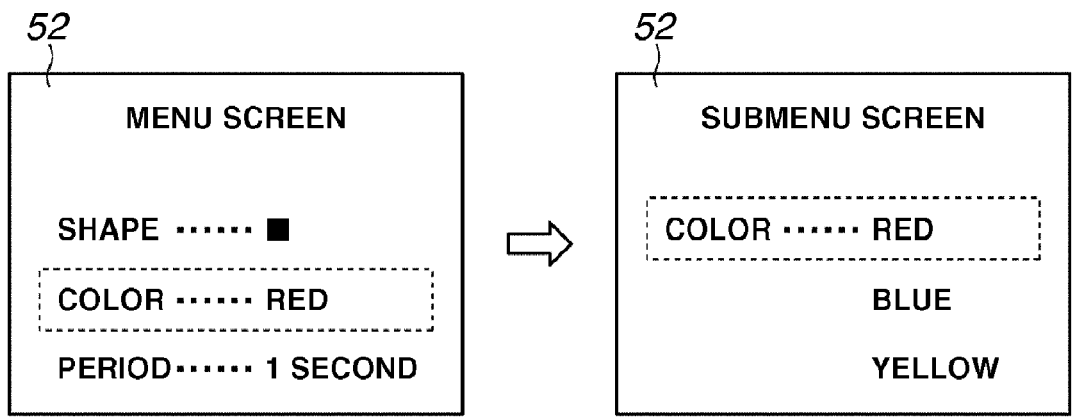
Figure 4C:
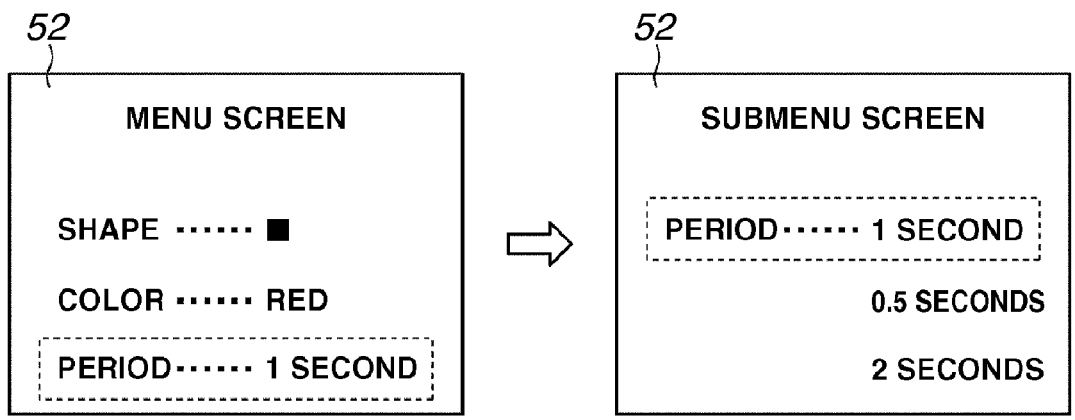

First, the USB flash memory 30 is connected to the USB port of the PC 50. The PC 50 opens an application for registering identification display information. When the application is opened, a menu screen as illustrated in FIGS. 4A to 4C is displayed on the display 52 (step S10). A user can set identification display information on the menu screen (step S11). In the illustrated example of FIG. 4A, a desired display shape can be selected on a sub menu screen. In the illustrated example of FIG. 4B, a desired display color can be selected on a sub menu screen. In the illustrated example of FIG. 4C, a desired display period can be selected on a sub menu screen.

After completion of setting of the identification display information (step S11), a WEP authentication key is issued. The WEP authentication key and the identification display information are written to the USB flash memory 30 (step S12). At the same time, this WEP authentication key and identification display information are also written to an HDD (not shown) of the PC 50 (step S13).

Figure 5:
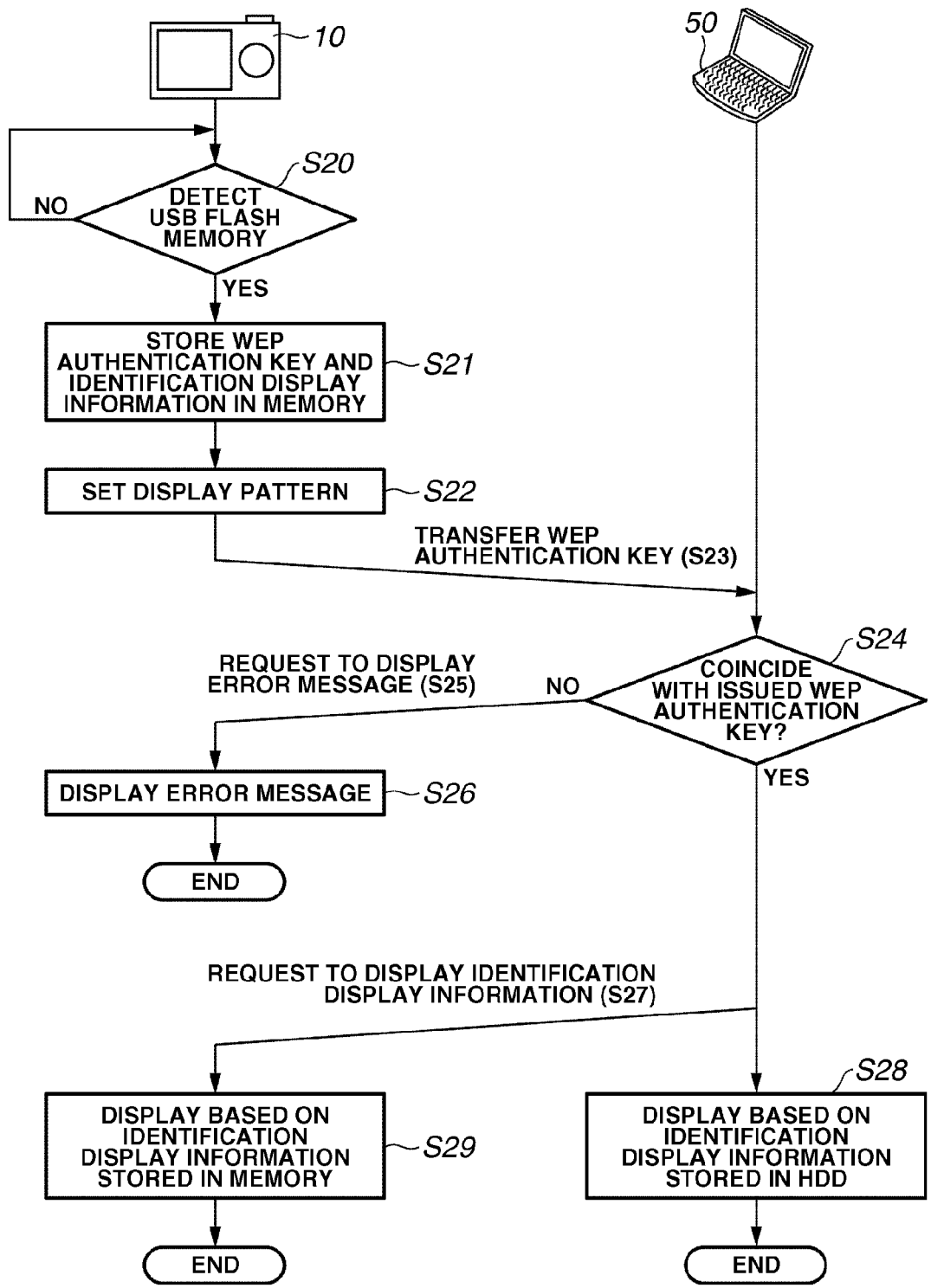
FIG. 5 is a flowchart of a sequence performed between a wireless communication device and a PC according to the exemplary embodiment.

Then, the USB flash memory 30 is disconnected from the USB port of the PC 50 and connected to the USB connector 16 of the wireless communication device 10. FIG. 5 illustrates an operational sequence performed between the wireless communication device 10 and the PC 50 after connecting the USB flash memory 30 to the wireless communication device 10.

In the wireless communication device 10, the USB memory control unit 18 detects that the USB flash memory 30 is connected to the USB connector 16 (step S20). Then, the CPU 20 reads the WEP authentication key and the identification display information from the USB flash memory 30, and stores the read WEP authentication key and identification display information to the memory 22 (step S21). Then, the CPU 20 sets a display pattern which is to be displayed on the liquid crystal panel 12 based on the identification display information (step S22), and transmits the WEP authentication key to the PC 50 through the wireless communication I/F unit 24 (step S23).

Upon receiving the WEP authentication key from the wireless communication device 10, the PC 50 determines whether the received WEP authentication key matches with the issued WEP authentication key (step S24). If it does not match (NO in step S24), the PC 50 requests the wireless communication device 10 to display an error message (step S25), and the wireless communication device 10 displays the error message on the liquid crystal panel 12 (step S26).

If the WEP authentication keys match with one another (YES in step S24), the PC 50 requests the wireless communication device 10 to display identification display information (step S27). The PC 50 displays graphic symbols, based on the identification display information stored in the HDD, on the display 52 (step S28). Upon receiving the request to display the identification display information from the PC 50, the wireless communication device 10 displays graphic symbols based on the identification display information stored in the memory 22 on a screen of the liquid crystal panel 12 (step S29).

Figure 6:
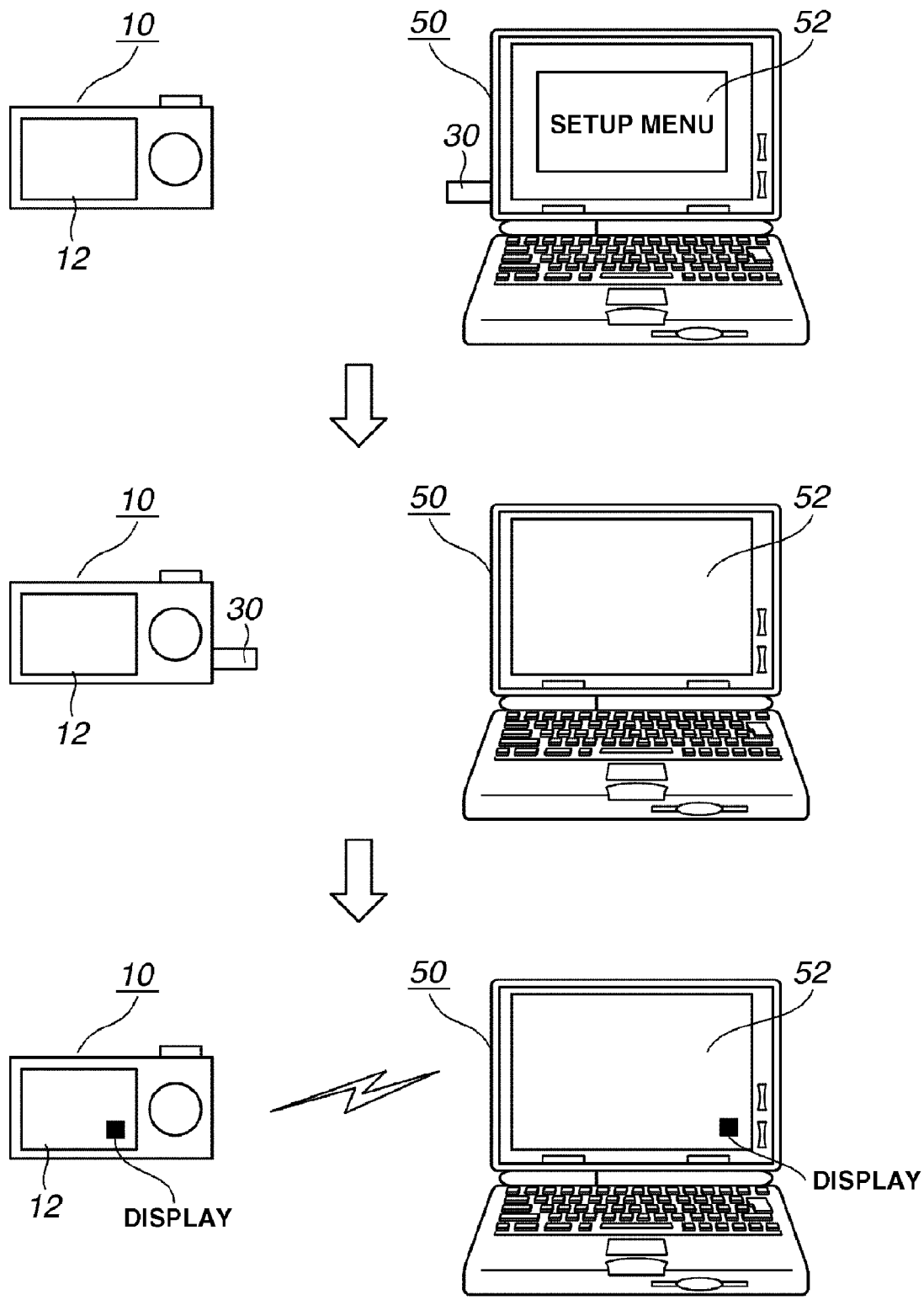
FIG. 6 illustrates a series of operations according to the exemplary embodiment.

FIG. 6 is a schematic diagram illustrating movement of the USB flash memory 30 between the wireless communication device 10 and the PC 50, and the associated wireless communication between the two.

As described above, the wireless communication device 10 displays identification information, on the liquid crystal panel 12, with a shape, a color, and a period identifying a device wirelessly communicating with the wireless communication device 10 based on identification display information stored in the memory 22. The PC 50, meanwhile, displays the same identification display information, which is stored in the HDD, on the display 52 with the same shape, color, and period. The wireless communication device 10 and the PC 50 display the identification display information with the same form (e.g., shape, color, and period), thus allowing a user to visually confirm that the wireless communication device 10 and the PC 50 are wirelessly communicating with each other. That is, a user can visually identify a device wirelessly communicating with the wireless communication device 10.

In the present embodiment, a red solid square symbol is displayed indicating that the wireless communication device 10 and the PC 50 are communicating with one another. However, as described above, a character or a symbol can be displayed to indicate that wireless communication is occurring. Alternatively, a sound can be output to indicate that wireless connectivity exists.

In addition, according to the present embodiment, the liquid crystal panel 12 and the display 52 display the same square shape. However, for example, the host device (PC 50) and the slave device (wireless communication device 10) can display different graphic symbols. That is, the PC 50 can display a square shape, and the wireless communication device 10 can display a circular shape.

Figure 7:
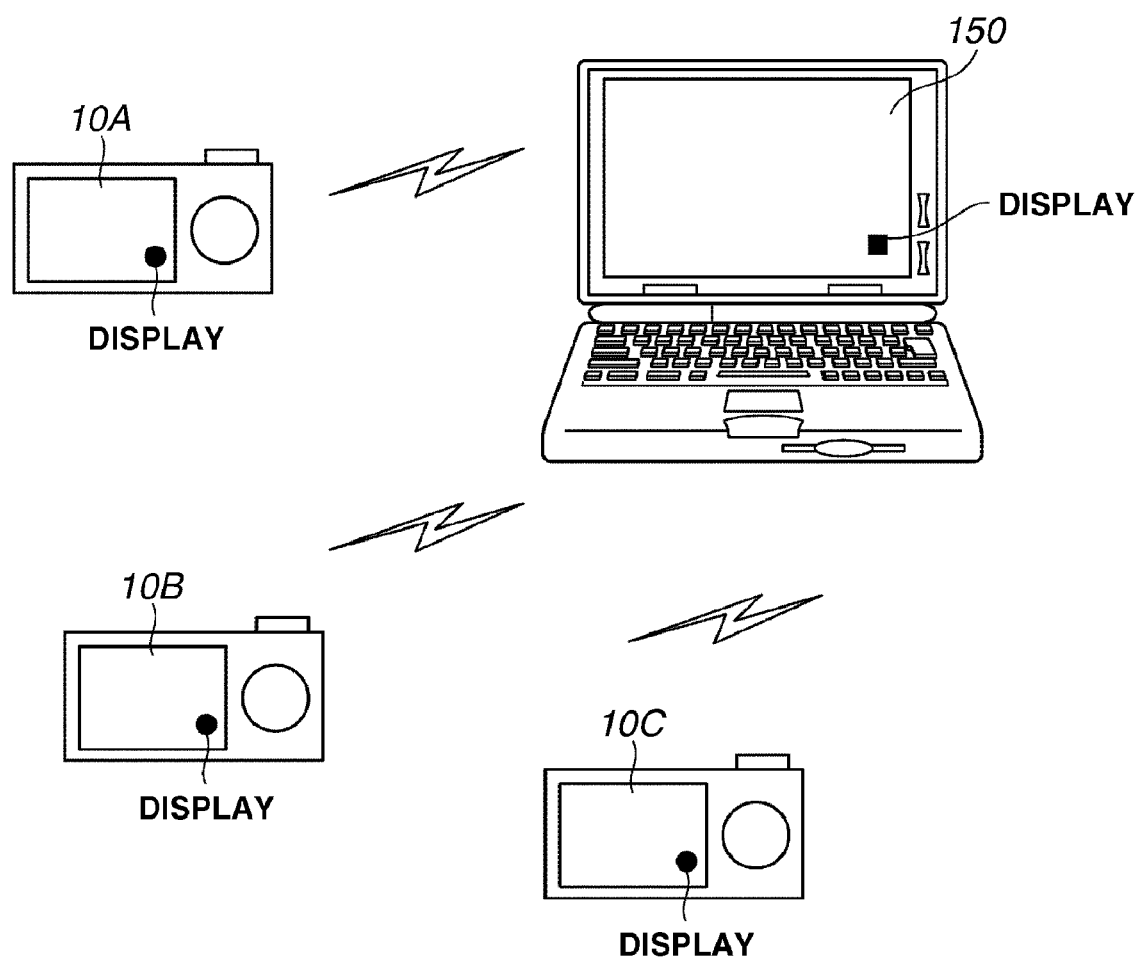
FIG. 7 illustrates a configuration of the wireless communication system according to the exemplary embodiment in an infrastructure mode.
Figure 8:
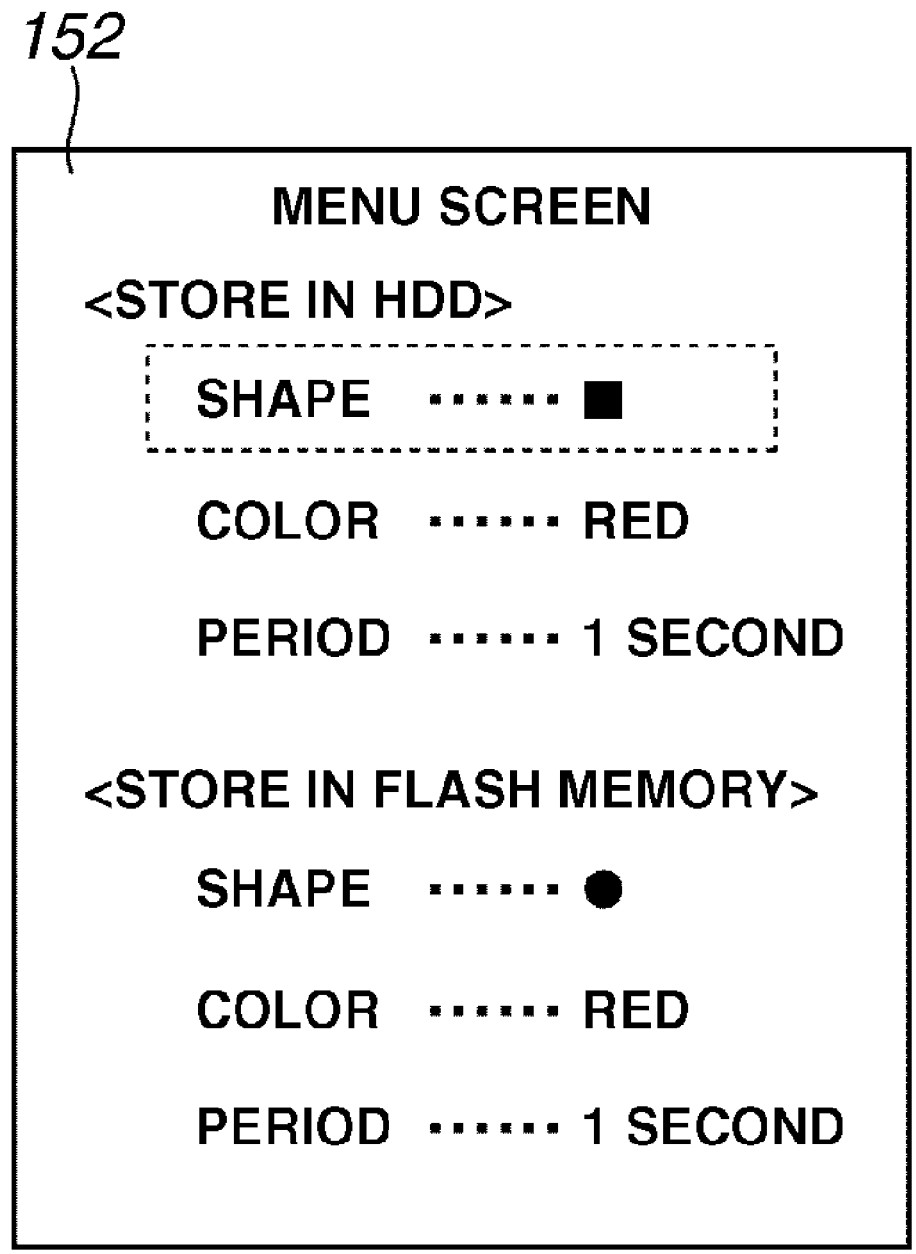
FIG. 8 illustrates a display example of a menu screen according to the exemplary embodiment.

The above description of the exemplary embodiment is directed towards the scenario where devices directly communicate with each other in an ad hoc mode. However, plural devices can communicate with each other in an infrastructure mode. In this case, as illustrated in FIG. 7, a graphic symbol (square in FIG. 7) representing a host device can be displayed on a PC 150. A graphic symbol (circle in FIG. 7) representing a slave device is displayed on wireless communication devices 10A, 10B, and 10C. In this case, identification display information stored in the HDD, and identification display information stored in the USB flash memory 30 differ only in shape as shown in FIG. 8. In another embodiment, the host device and the slave device can be distinguished by varying the color or period information.

In the case where the host device and the slave device display the same shape, color, and period, and an additional character for distinguishing the host device from the slave device is displayed around or inside the display graphic symbols, the host device and the slave device can be easily distinguished.

While the present invention has been described with reference to the exemplary embodiment, it is to be understood that the invention is not limited to the disclosed exemplary embodiment. The scope of the following claims is to be accorded the broadest interpretation so as to encompass all modifications, equivalent structures, and functions.

This application claims priority from Japanese Patent Application No. 2006-077966 filed Mar. 22, 2006, which is hereby incorporated by reference herein in its entirety.

What is claimed is:

1. A wireless communication system comprising:
a plurality of wireless communication devices, the plurality of wireless communication devices connectable via a removable memory,
wherein a first wireless communication device comprises:
a first display control unit configured to control a display unit of the first wireless communication device;
a setting unit configured to set a control information to control a display image to be displayed by a display unit of at least one other wireless communication device; and
a write unit configured to write the control information together with the authentication key for wireless communication to the removable memory,
wherein the control information is different from an authentication key for wireless communication and includes at least one of a display shape, a display color, and a display period, and
wherein a second wireless communication device comprises:
a second display control unit configured to control a display unit of the second wireless communication device;
a reading-out unit configured to read out the control information set by the first wireless communication device and the authentication key from the removable memory, in a case where the removable memory is connected to the second wireless communication device; and
an authentication unit configured to execute an authentication process to authenticate the first wireless communication device by using the authentication key read-out from the reading-out unit,
wherein, in a case where the authentication process succeeds, the first display control unit displays the display image in accordance with the control information set by the setting unit, and the second display control unit controls the display unit of the second wireless communication device to display the display image in accordance with the control information read out from the removable memory, the display of the display image in accordance with the control information by the first display control unit and the display of the display image in accordance with the control information by the second display control unit being performed simultaneously.

2. The wireless communication system according to claim 1, wherein the authentication key is a WEP authentication key.

3. The wireless communication system according to claim 1, wherein the first and second wireless communication devices communicate with each other in either an ad hoc mode or an infrastructure mode.

4. A method for communicating between a plurality of wireless communication devices, the plurality of wireless communication devices connectable via a removable memory, the method comprising:
controlling a display unit of a first wireless communication device;
setting control information in the first wireless communication device to control a display image to be displayed by a display unit of at least one other wireless communication device;
writing the control information together with an authentication key for wireless communication to the removable memory, wherein the control information is different from an authentication key for wireless communication and includes at least one of a display shape, a display color, and a display period;
controlling a display unit of a second wireless communication device;
reading out, by the second wireless communication device, the control information set by the first wireless communication device and the authentication key from the removable memory, in a case where the removable memory is connected to the second wireless communication device;
executing, by the second wireless communication device, an authentication process to authenticate the first wireless communication device by using the authentication key read-out from the removable memory;
wherein, in a case where the authentication process succeeds, the display unit of the first wireless communication device displays the display image in accordance with the control information set by the setting unit, and the display unit of the second wireless communication device displays the display image in accordance with the control information read out from the memory, the display of the display image in accordance with the control information by the first display unit of the first wireless communication device and the display of the display image in accordance with the control information by the second display unit being performed simultaneously.

5. The method according to claim 4, wherein the authentication key is a WEP authentication key.

6. The method according to claim 4, wherein the first and second wireless communication devices communicate with each other in either an ad hoc mode or an infrastructure mode.

7. The wireless communication system according to claim 1, wherein the setting unit is able to separately set control information for displaying the display image displayed by the first display control unit and control information for displaying the display image displayed by the second display control unit.

8. The method according to claim 4, wherein setting control information includes the ability to separately set control information for displaying the display image displayed by the display control unit of the first wireless communication device and control information for displaying the display image displayed by the display control unit of the second wireless communication device.

* * * * *